United States Patent
Yu et al.

(10) Patent No.: US 9,262,362 B2
(45) Date of Patent: Feb. 16, 2016

(54) MULTI-CYCLE DELAY FOR COMMUNICATION BUSES

(71) Applicant: Apple Inc., Cupertino, CA (US)

(72) Inventors: Shu-Yi Yu, Sunnyvale, CA (US); Timothy R. Paaske, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/041,818

(22) Filed: Sep. 30, 2013

(65) Prior Publication Data

US 2015/0095535 A1   Apr. 2, 2015

(51) Int. Cl.
*G06F 3/00* (2006.01)
*G06F 5/00* (2006.01)
*G06F 13/40* (2006.01)
*G06F 9/38* (2006.01)

(52) U.S. Cl.
CPC .......... *G06F 13/4068* (2013.01); *G06F 9/3869* (2013.01)

(58) Field of Classification Search
CPC ................. G06F 13/4068; G06F 9/3869
USPC ................................................. 710/58
See application file for complete search history.

(56) References Cited

U.S. PATENT DOCUMENTS

| | | | |
|---|---|---|---|
| 6,182,233 B1 * | 1/2001 | Schuster et al. | 713/400 |
| 6,571,308 B1 | 5/2003 | Reiss et al. | |
| 8,250,280 B1 | 8/2012 | Rohana et al. | |
| 2012/0194712 A1 | 8/2012 | Crook et al. | |

* cited by examiner

*Primary Examiner* — Chun-Kuan Lee
(74) *Attorney, Agent, or Firm* — Meyertons, Hood, Kivlin, Kowert & Goetzel, P.C.

(57) ABSTRACT

A system is disclosed that may compensate for bus timing that may vary over operating conditions of a bus. The system may include a communication bus, a first functional unit configured to transmit data via the communication bus, and a second functional unit configured to receive data via the bus. The first functional unit may transmit a first value via the communication bus to the second functional unit. The first functional unit may be further configured to assert a data valid signal responsive to a determination that a first time period has elapsed since the transmission of the first data value. The second functional unit may be configured to receive the first data value and sample the first data value dependent upon the data valid signal.

20 Claims, 8 Drawing Sheets

FIG. 9 though the disclosure is susceptible to various modifica-
MULTI-CYCLE DELAY FOR COMMUNICATION BUSES

BACKGROUND

1. Technical Field

This invention is related to the field of integrated circuit implementation, and more particularly to the implementation of bus timing architectures.

2. Description of the Related Art

Computing systems may include one or more systems-on-a-chip (SoCs), which may integrate a number of different functions, such as, graphics and audio processing, onto a single integrated circuit. With numerous functions included in a single integrated circuit, chip count may be kept low in mobile computing systems, such as smartphones and tablets, for example, which may result in reduced assembly costs, and a smaller form factor for such mobile computing systems.

As geometries on semiconductor processes continue to shrink and processing performance requirements continue to increase, timing of critical signals across an integrated circuit may be difficult to maintain. To improve manufacturing yields, SoC designers may attempt to guarantee timing of some or all of these signals. Guaranteeing timing refers to a process that may involve simulating or estimating delays of signals as they propagate throughout the chip, and analyzing and correcting these delays such that sufficient setup and hold times are provided to the circuits receiving the critical signals. Guaranteeing the timing of the signals may be even more difficult for multi-bit buses that may run to several functional blocks included in the integrated circuit, where the timing of all signals on the bus needs to be balanced. To simplify timing, many buses are synchronized to a system clock such that a new value is placed on the bus during each clock cycle.

Timing of signals throughout an SoC design, may be estimated before the design is manufactured by employing a method known as Static Timing Analysis (STA) may be employed. STA refers to a step in an SoC design process in which the expected timing of some or all of the digital circuits in an SoC design may be computed without the need for a full chip simulation to be run. Since full chip circuit level simulations may be time consuming and computing power intensive, STA may be utilized as an alternative method for identifying and analyzing the timing of critical signals.

SUMMARY OF THE EMBODIMENTS

Various embodiments of a data bus system are disclosed. Broadly speaking, a system, an apparatus, and a method are contemplated in which the system includes a communications bus, a first functional unit coupled to the communications bus, and a second functional unit also coupled to the communications bus. The first functional unit may be configured to transmit a first data value on the data bus and then assert a data valid signal in response to determining a time period has elapsed since the transmission of the data value. The second functional unit may be configured to receive the transmitted data value and then sample the received data value in response to the assertion of the data valid signal.

In a further embodiment, the first functional unit may be configured to de-assert the data valid signal in response to having a second data value to transmit, and then transmit the second data value on the bus in response to determining a time period has elapsed since the transmission of the second data value.

In other embodiments, the second functional unit may be further configured to assert an acknowledge signal in response to sampling the received first data. In further embodiments, the first functional unit may be further configured to de-assert the data valid signal upon receiving the acknowledge signal. And in still further embodiments, the second functional unit may be further configured to de-assert the acknowledge signal upon receiving the de-asserted data valid signal.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Since an SoC may integrate multiple features into a single circuit, they are a popular choice for portable devices where space for components is limited.

To allow the multiple functional blocks to communicate with one another, SoCs connect the functional blocks together using a bus. In some embodiments, an SoC may include one or more buses that do not update on each clock cycle. Such a bus may be described as pseudo-static. For such buses, a data valid signal may be asserted after a delay from an update of the bus. By delaying an assertion of the valid signal, ample time may be provided for the signals of the bus to propagate and stabilize.

Static Timing Analysis (STA) may be employed during the design of an SoC to determine how critical timing is on a given bus before the SoC is manufactured. STA may highlight a need for more control of timing on a particular bus and may allow for different timing and circuit changes to be tested over a range of operating conditions, thereby providing a mechanism to predict performance and manufacturing yield of the SoC. Conversely, an embodiment such as described in this disclosure may be used to improve the STA capabilities and reduce a number of issues that might otherwise be discovered by STA.

Various embodiments of a bus communication method are described in this disclosure. A system is disclosed that may compensate for bus timing that may vary over operating conditions and that may be unequal between the bit-lines of the bus. Some embodiments may require prior knowledge of expected delays between the sending and receiving units on the bus. The embodiments illustrated in the drawings and described below may provide techniques for transferring data across a data bus within a computing system when delays may be expected.

System-on-a-chip Overview

Figure 1:
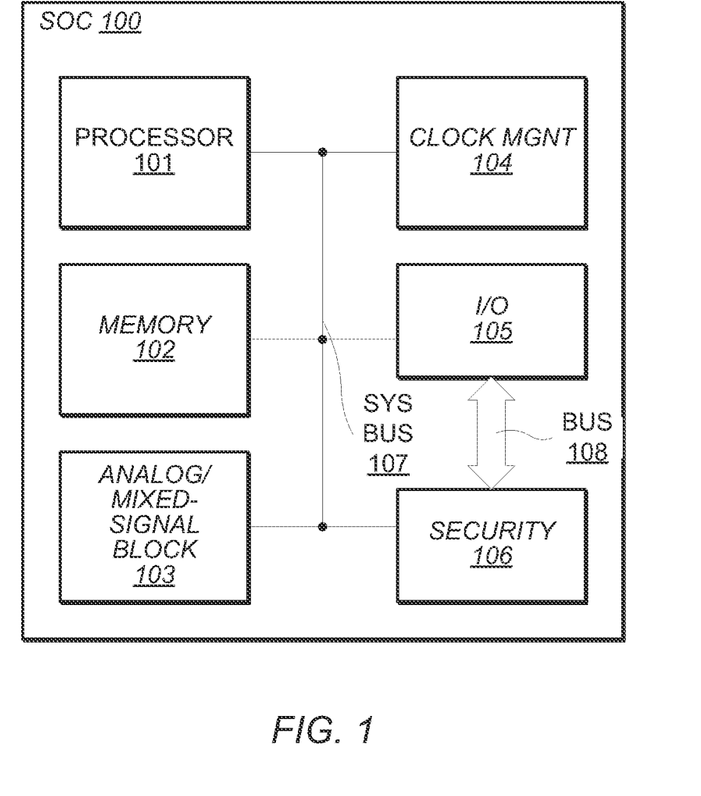
FIG. 1 illustrates an embodiment of a system.

A block diagram of an SoC is illustrated in FIG. 1. In the illustrated embodiment, the SoC 100 includes a processor 101 coupled to memory block 102, an analog/mixed-signal block 103, a clock management unit 104, an I/O block 105, and a security unit 106, through a bus 107. In some embodiments, I/O block 105 and security unit 106 may additionally be coupled by supplemental bus 108. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block 102, for example.

Memory 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include a single memory and other embodiments may include more than one memory blocks (not shown). Memory 102 may include multiple instantiations of the same type of memory or may be a mix of different types of memory. In some embodiments, memory 102 may be configured to store program code or program instructions that may be executed by processor 101. Memory 102 may, in other embodiments, be configured to store data to be processed, such as, for example, graphics data.

Analog/mixed-signal block 103 may include a variety of circuits including, for example one or more voltage regulators, an analog-to-digital converter (ADC), and a digital-to-analog converter (DAC) (all not shown). In some embodiments, analog/mixed-signal block 103 may also include a crystal oscillator, a phase-locked loop (PLL), a frequency-locked loop (FLL), and/or an internal oscillator.

Clock management unit 104 may be configured to manage clock distribution to some or all of the functional blocks included in SoC 100. In some embodiments, some or all of the clock signals in the SoC may be managed by clock management unit 104. Managing clock signals may include controlling clock gates to various functional blocks and monitoring the frequency of the clock signals to detect if they are running too slow or too fast. In some embodiments, clock management unit 104 may include sub-blocks for managing multiple clock sources for various functional blocks.

I/O block 105 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 105 may be configured to implement a version of Universal Serial Bus (USB) protocol, IEEE 1394 (Firewire®) protocol, or, and may allow for program code and/or program instructions to be transferred from a peripheral storage device for execution by processor 101.

Security unit 106 may include one or more circuits for managing data protection needs of the SoC. Circuits included in security unit 106 may include an encryption hardware accelerator, a hashing hardware accelerator, and the like. These circuits may be used for generating hash codes for files to be transmitted to or files received from a communications interface.

System bus 107 may couple multiple functional blocks together hereby allowing communication between the coupled blocks. System bus 107 may support one of any suitable protocols and may be any number of bits wide, such as 16 bits, 32 bits or 64 bits wide. System bus may operate at a system clock frequency, such that a new value may be transmitted during each period of the system clock. In other embodiments, system bus may operate at a speed slower than the system clock.

Supplemental bus 108 may couple fewer functional blocks than system bus 106. In some embodiments, supplemental bus 108 may only couple two functional blocks and in other embodiments, more than two functional blocks may be coupled. Supplemental bus 108 may operate at a frequency similar to system bus 107. In other embodiments supplemental bus 108 may operate at a slower frequency than the system clock. In some embodiments, supplemental bus 108 may operate at a frequency that is several times slower than the system clock.

In general, buses may present several challenges for an SoC designer. A bus may be considered a collection of wires connected to two or more functional blocks for the purpose of transmitting data, addresses, instructions, and other values from one functional block to one or more other blocks, with each wire (also referred to herein as a "bit line") transmitting one bit value. One challenge may be that the physical length may impact the speed with which a signal propagates from a transmitting block to a receiving block. The longer the length between the blocks, the longer it may take for a signal to travel from one to the other. Various design considerations, such as adding more features to a single SoC, may push an SoC designer to include more functional blocks within the design and therefore may require a longer bus to connect the additional blocks to the other blocks in the system.

Another challenge, in designing busses, may be coupling between adjacent bit lines may along the length of the bus. Such coupling may be capacitive, inductive, or a combination thereof, may result in one transmitted signal interfering with another. The phenomenon is commonly referred to as "crosstalk." For example, assume a given wire is between two adjacent wires. If the signal on the given wire transitions from high to low while the two adjacent wires transition from low to high, crosstalk may cause the high to low transition on the given wire to occur more slowly.

Bus length and crosstalk are two challenges that may impact the performance of a bus. Other challenges may include increased resistance and capacitance as buses may be increased in length and connected to more functional blocks. Another challenge may be decreased operating voltages on the buses. In some embodiments, a bus may have a lower operating voltage than other functional blocks in an SoC and in other embodiments, the overall operating voltage of the SoC may be reduced. A lower operating voltage, higher resistance, and higher capacitance may each impact the performance of a bus by increasing propagation delays.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Communications Bus Overview

Figure 2:
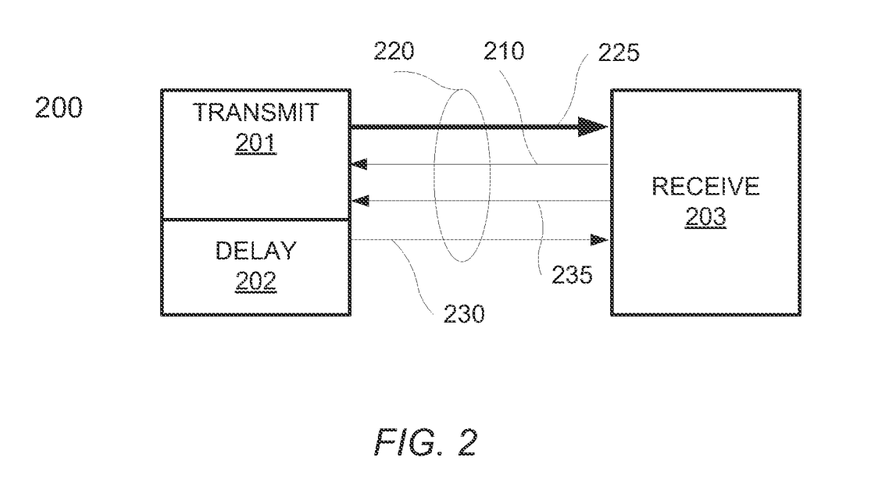
FIG. 2 illustrates a block diagram of an embodiment of two functional blocks connected by a bus.

FIG. 2 shows a block diagram of an embodiment for a communications bus system 200. Communications bus system 200 may be a part of an SoC, such as, for example, SoC 100 in FIG. 1. Communications bus system 200 may include a transmitting unit 201, delay logic 202, and receiving unit 203. Transmitting unit 201 may be coupled to receiving unit 203 through data bus 220. Data bus 220 may include data bit lines 225, data valid signal 230, and acknowledge signal 235. Bus system 200 may be a network used to transfer data from transmitting unit 201 to receiving unit 203. The data transmitted via communications bus system 200 may include, but not limited to, any suitable form of data such as, for example, raw data values, images, music, video, documents, program instructions, commands, and responses to commands.

Transmitting unit 201 may correspond to security unit 106 in FIG. 1. Transmitting unit 201 may be used, for example, to generate a hash code for a file that is to be sent via a communications interface. A given file may have a single unique hash code and may therefore be used by a system receiving the given file to help verify the file was received correctly. If an error occurs during the transmission of the file, a hash code generated by the receiving system may not match the hash code sent by the transmitting system, thereby indicating the received file is corrupted.

Figure 8:
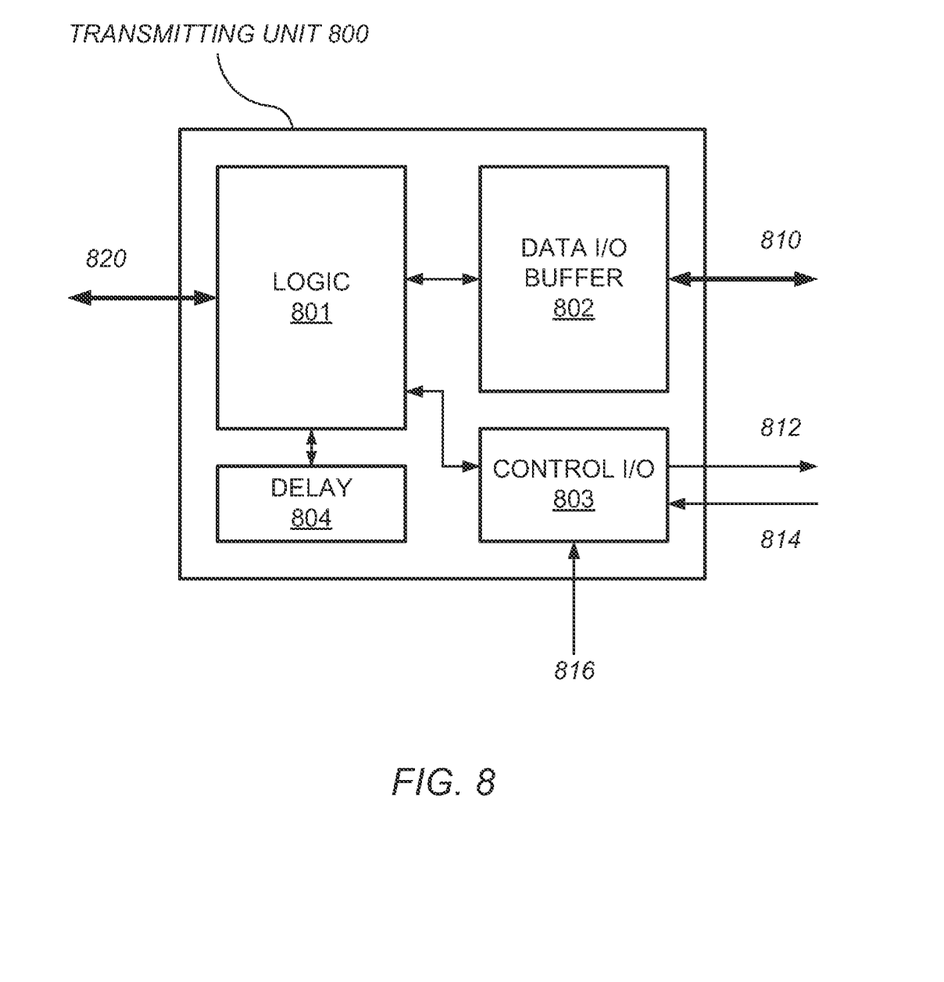
FIG. 8 illustrates a block diagram of an embodiment of a transmitting unit.

An embodiment of a transmitting unit, such as, e.g., transmitting unit 201, is illustrated in FIG. 8. Transmitting unit 800 may correspond to transmitting unit 201 in FIG. 2. Transmitting unit 800 may include logic block 801, which may be coupled to data I/O buffer 802, coupled to control I/O 803 and coupled to delay circuit 804. Logic block 801 may also be coupled to a system bus through interface 820.

Logic block 801 may control the receiving of data from another functional block on the system bus through interface 820. In some embodiments, logic block 801 may store data locally and in other embodiments, logic block 801 may generate data itself. Logic block 801 may control the transmitting and receiving of data through data I/O buffer 802 and the assertion and de-assertion of control signals through control I/O 803. Logic block 801 may also, in certain embodiments, control the initialization and enablement of delay circuit 804.

Data I/O buffer 802 may hold a current data value that is being sent via data bit lines 810, which may correspond to data bit lines 225 in FIG. 2. Data buffer I/O may be of any suitable number of bits to match the number of data bit lines 810. In other embodiments, data I/O buffer 802 may have more or fewer bits than data bit lines 810. In some embodiments, transmitting unit 800 may include more than one data I/O buffer 802. Data I/O buffer 802 may include separate buffers for data to be transmitted and for data being received. In other embodiments, the same buffer may be used for both transmitted data and received data.

Control I/O 803 may send and receive control signals associated with a communications bus, such as, for example, communications bus 220 in FIG. 2. Control I/O 803 may send the current state of data valid 812, which may correspond to data valid signal 230. Control I/O 803 may receive the current state of acknowledge 814, which may correspond to acknowledge signal 235. Control I/O 803 may also receive data request 816, which may correspond to data request 210. Control I/O 803 may provide the received signals to logic block 801.

Delay circuit 804 may be a part of transmitting unit 800 as shown, or delay circuit 804 may be a separate functional unit coupled to transmitting unit 800 (not shown). Delay circuit 804 may, in some embodiments, correspond to delay circuit 202 and may function as described below.

Returning to FIG. 2, transmitting unit 201 may include a delay circuit 202. In other embodiments, delay circuit 202 may be a separate functional block coupled to transmitting unit 201 such that any delays in signals between transmitting unit 201 and delay circuit 202 are much smaller than delays through data bus 220. Transmitting unit 201 may use delay circuit 202 to insert a period of time in between transmitting unit 201 sending data on data bit lines 225 and asserting data valid signal 230.

In some embodiments, delay circuit 202 may be a digital counter circuit. In such embodiments, delay circuit 202 may count up from a value of zero, incrementing on a rising and/or falling edge of a periodic input signal such as, for example, a system clock. Delay circuit 202 may assert a timeout signal upon the counter reaching a target value. This target value may be programmable, either by transmitting unit 201 or by another functional block within SoC 100, such as processor 101 in FIG. 1. In other embodiments, delay circuit 202 may count down from an initial value and assert the timeout signal upon the counter reaching zero. In some embodiments, the initial value may be programmable similar to the target value in the count up example.

In other embodiments, delay circuit 202 may be a resistor-capacitor (RC) circuit rather than a digital counter. In such embodiments, one or more resistors and one or more capacitors may be coupled together to form a circuit with a given time constant for dissipating electric charge. Such an embodiment may operate by charging the RC circuit to a known voltage and asserting a timeout signal upon the voltage of the RC circuit reaching a second known voltage. The time constant of the RC network will correlate to the time period of the delay. In some embodiments, the time constant of the RC circuit may be programmable by switching one or more resistors and/or one or more capacitors.

In further embodiments, delay circuit 202 may be a series of logic circuits, such as, for example a chain of inverters, such that a signal asserted at the input of the series is delayed at the output of the series by a period of time. In some embodiments, the delay through the series may be fixed, although operating conditions such as voltage and temperature may cause fluctuations in the delay time. In other embodiments, the number of logic circuits in the series may be selectable through the use of switches and or multiplexors.

Receiving unit 203 may correspond to I/O block 105 in FIG. 1. Receiving unit 203 may include an Ethernet network interface circuit. I/O block 105 may require a hash code for a file that is being sent. In some embodiments, receiving unit 203 may request the hash code from transmitting unit 201 to send with the file.

Data request 210 may indicate to transmitting unit 201 that a data value has been requested. The data request may come directly from receiving unit 203 or it may come from another functional block in SoC 100 such as, for example, processor 101. In other embodiments, data request 210 may be generated internally in transmitting unit 201. In some embodiments, transmitting unit 201 may transmit data on data bus 220 on a falling edge of data request 210 and, in other embodiments, on the rising edge of data request 210. In some embodiments with more than one transmitting block coupled to data bus 220, one or more blocks may transmit on a rising edge and one or more different blocks may transmit on a falling edge.

Data bus 220 may, in various embodiments, correspond to supplemental bus 108 in FIG. 1. In some embodiments, data bus 220 may only couple transmitting unit 201 and receiving unit 203 together, while in other embodiments data bus 220 may couple several functional blocks together. Data bus 220 may include data bit lines 225, which may be of any suitable width, such as 8 bits, 16 bits, 32 bits or more. Data bus 220 may also include control signals, such as data valid signal 230 and acknowledge signal 235. Data valid signal 230 may be used to signal a receiving block, such as, for example, receiving unit 203, that a new data value has been sent on data bit lines 225. Acknowledge signal 235 may be used to signal a transmitting block, such as, for example, that the receiving block has sampled the most recent data on data bit lines 225. In other embodiments, an acknowledge signal may not be used.

The embodiment illustrated in FIG. 2 is merely one embodiment of a communications bus. In other embodiments, different numbers of functional blocks may be coupled and different and/or additional control signals may be employed.

Waveforms for Data Bus Transfers

Figure 3:
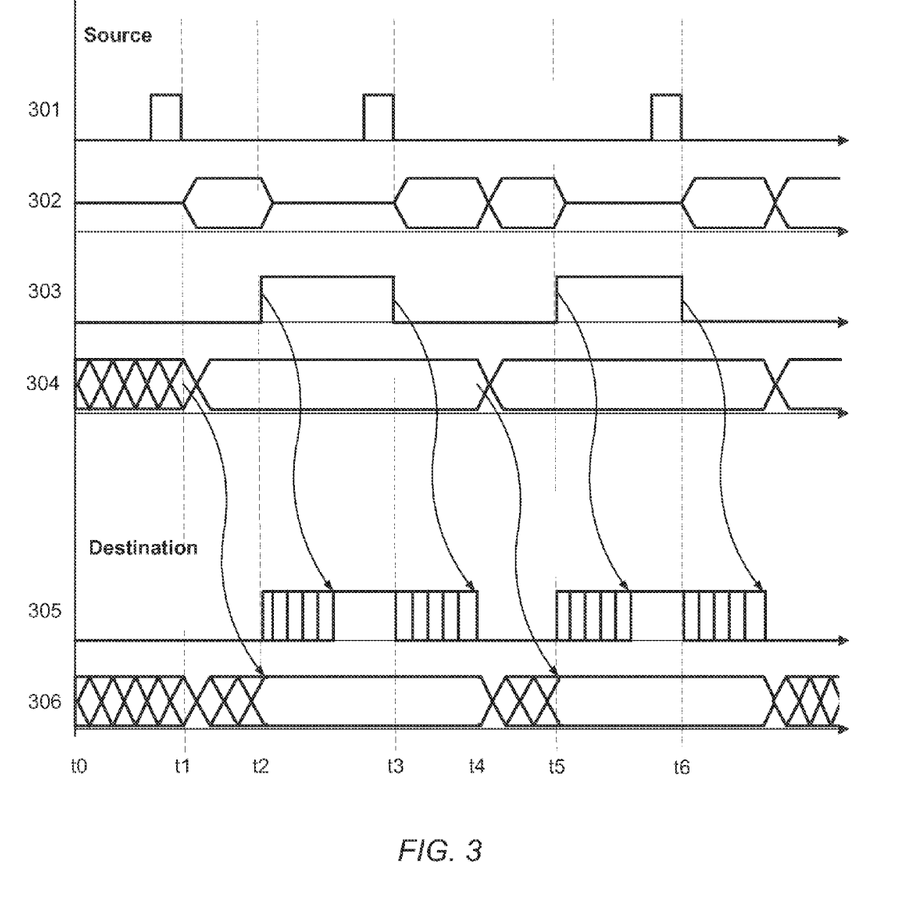
FIG. 3 illustrates possible waveforms corresponding to an embodiment of a data bus.

Turning to FIG. 3, example waveforms that may result from the communication of two functional blocks over a communication bus as illustrated in FIG. 2 are depicted. Referring collectively to the waveforms in FIG. 3 and communications bus 200 from FIG. 2, an example of a data bus communications from a transmitting unit, such as transmitting unit 201, to a receiving unit, such as receiving unit 203. In this embodiment, acknowledge signal 235 is not utilized. It is noted that transmitting unit 201 and receiving unit 203 may represent any functional blocks that may be connected to a common bus.

Waveforms 301-304 may represent signals as they appear at the interface to transmitting unit 201. Waveforms 305-306 may represent signals as they appear at the interface to receiving unit 203. Waveform 301 may represent data request 210 which may indicate to transmitting unit 201 that data has been requested to be sent via data bus 220. Waveform 302 may represent the activity of delay circuit 202. The flat line segments, such as between times t0 and t1, may indicate delay circuit 202 is idle and the other times, such as between times t1 and t2, may indicate delay circuit 202 is active. Waveform 303 may represent the state of data valid signal 230 as set by transmitting unit 201. Waveform 304 may represent data bit lines 225 as driven by transmitting unit 201. Waveforms 305 and 306 may represent the state of data valid signal 230 and data bit lines 225, respectively, as received by receiving unit 203.

At time t0, data bit lines 225 may have an indeterminate value at both transmitting unit 201 and receiving unit 203 as shown by waveforms 303 and 306. Data valid signal 230 is low at this time, which may indicate that data bit lines 225 are not ready for reading. Data request 210 is also low at this time, indicating no request for data.

At time t1, a falling edge on data request 210 may be received by transmitting unit 201. In response to the falling edge, delay circuit 202 may initialize and begin counting a time period. In some embodiments, the time period may be set during factory test of the SoC or in other embodiments the time period may be adjustable based on the current operating conditions of the SoC. Also responsive to the falling edge of data request 210, transmitting unit 201 may write a new value to the data bit lines 225. Due to distance from the transmitting unit 201 to the receiving unit 203 and/or due to capacitive loading on data bit lines 225, the new value written by transmitting unit 201 may take some time to propagate to receiving unit 203. On waveform 306 this uncertainty in the data bus value is shown with the cross hatched lines. The value on data bit lines 225 at the I/O interface may propagate through sometime after t1 and before t2. This propagation delay is highlighted by the arrow from waveform 304 to waveform 306 after time t1.

At time t2, delay circuit 202 may complete counting the time period and may assert a signal to transmitting unit 201 and then may go into an idle state. In response to the end of the time period, transmitting unit 201 may assert data valid signal 230. Due to the propagations delays discussed above, the data valid signal may take time to propagate to receiving unit 203. This propagation delay is highlighted by the arrow from waveform 303 to waveform 305 after time t2. Responsive to receiving the rising edge of data valid signal 230, receiving unit 203 may sample data bit lines 225.

At time t3, another falling edge of data request 210 may be received by transmitting unit 201, indicating the next data may have been requested. In response to the falling edge, delay circuit 202 may initialize and begin counting another time period. In some embodiments, this time period may be the same the previous time period and in other embodiments, the time period may change responsive to changing operating conditions. Transmitting unit 201 may also de-assert data valid signal 230 responsive to the falling edge of data request 210. Just as the rising edge of data valid signal 230 may take time to propagate to receiving unit 203, the falling edge may take a similar time to propagate through, as indicated by the arrow from waveform 303 to waveform 305.

At time t4, delay circuit 202 may again complete the counting of the time period and signal transmitting unit 201 that the time period has elapsed. In response to the end of the time period, transmitting unit 201 may write the new data value to data bit lines 225. By time t4, the de-asserted value of data valid signal 230 may have propagated to receiving unit 203. Delay circuit 202 may reset and begin a new count of a new time period Delay circuit 202 may complete the latest time period count and may again signal transmitting unit 201 that the time period has elapsed at time t5. Responsive to the end of the time period, transmitting unit 201 may again assert data valid signal 230 to signal receiving unit 203 that the new data is ready to be read. Responsive to receiving the rising edge of data valid signal 230 after the propagation delay, receiving unit 203 may sample data bit lines 225.

At time t6, a third data request may be received by transmitting unit 201 as indicated by the falling edge of data request 210. At this point, the behavior of communications bus 200 may be repeated as described for times t3-t5.

It is noted that the waveforms illustrated in FIG. 3 are merely examples. In various embodiments, the waveforms may vary due to, for example, the specific circuits used, the technology the circuits are created in, and potential electromagnetic noise within the system. In addition, the polarity of the signals may differ from what is illustrated, such as, for example, data valid signal 203 may be active low instead of active high as illustrated in FIG. 3.

Methods for Transferring Data Across a Communications Bus

Figure 4:
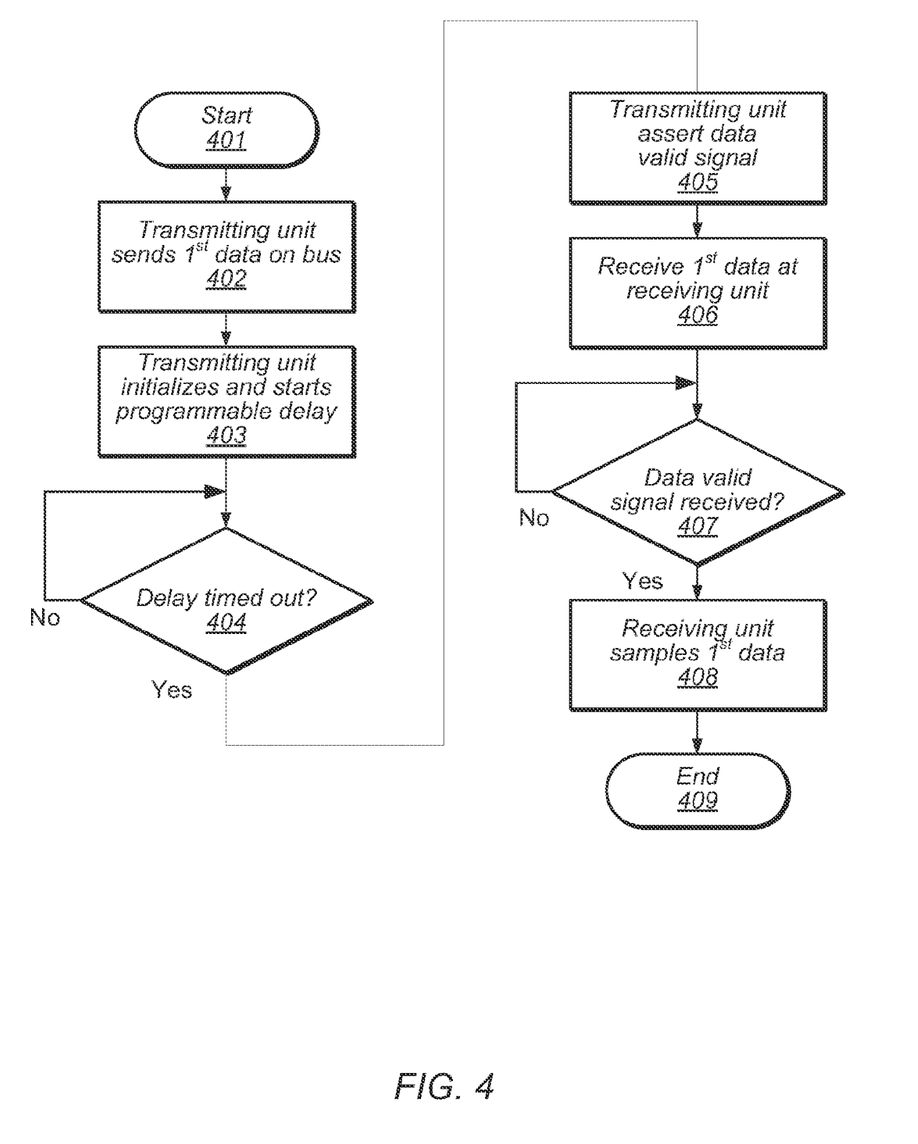
FIG. 4 illustrates an embodiment of a method for transferring data via a data bus.

Moving on to FIG. 4, a flow chart is illustrated depicting a method for transferring data across a data bus. The data may include, but not be limited to, data values, addresses, processor instructions, commands to functional blocks, and acknowledges to commands. The method may be employed by a communications bus such as, for example, communications bus 200 in FIG. 2. Referring collectively to FIG. 3 and FIG. 4, the method may begin in block 401. Transmitting unit 201 and receiving unit 203 are used as examples of a transmitting unit and receiving unit, respectively. However, this method may apply to any functional blocks coupled to a common data bus.

Responding to a request for data from, for example, receiving unit 203, transmitting unit 201 may write a first data word to data bit lines 225 (block 402). Values written onto data bit lines 225 by transmitting unit 201 may experience propagation delays before the values can be read by receiving unit 203. These propagation delays may be caused by capacitive loading of data bit lines 225, by the process technology used in the manufacturing of the circuits, the length of data bit lines 225, or any other factors that may influence the timing of signals from source to destination.

To account for the propagation delay from transmitting unit 201 to receiving unit 203, transmitting unit 201 may delay asserting data valid signal 230 after writing the new value on data bit lines 225. To delay a known period of time, transmitting unit 201 may reset and start delay circuit 202 (block 403). In some embodiments, the time period may be a fixed amount of time set by the design of the circuit. In other embodiments, the time period may be programmable and may be adjusted based on current operating conditions. In further embodiments, the time period may be established during factory testing of the SoC or testing of the device in which the SoC is used.

The method may now be dependent upon delay circuit 202. Transmitting unit 201 may wait for a signal from delay circuit 202 to indicate the time period has expired (block 404). If the time period has not expired, the method may remain at block 404. Once the time period has expired, the method may move to block 405.

Transmitting unit 201 may assert data valid signal 230 upon the time period expiring (block 405). Asserting data valid signal 230 may indicate to receiving unit 203 that data bit lines 225 are ready to be sampled. In various embodiments, data valid signal 230 may be an active high signal or an active low signal. Data valid signal 230 may have a similar delay as data bit lines 225. In other embodiments, data valid signal 230 may have a shorter propagation delay than data bit lines 225.

Receiving unit 203 may receive the first data word from transmitting unit 201 (block 406). Receiving unit 203 may not sample until data valid signal 230 has been received, which occurs after the data word has been received. This may help ensure that receiving unit 203 samples a good value for the data word and reduce communication errors. In some embodiments, the first data word may be received before the time period expires and in other embodiments the data word may be received after the time period expires. In the case in which the data word is received after the time period expires, the timing of data bus 220 may depend on the propagation delay of data valid signal 230 to help ensure data valid signal 230 isn't received by receiving unit 203 before the data word is received.

Receiving unit 203 may wait for data valid signal 230 to be asserted (block 407). In some embodiments, receiving unit 203 may perform other functions while waiting for data valid signal 230 to be asserted. If data valid signal 230 has not been received, then the method may remain in block 407. Receiving unit 203 may poll data valid signal 230 until the signal is asserted or in other embodiments, an edge sensitive trigger circuit may be used such that data bit lines 225 are sampled upon the transition of data valid signal from the de-asserted state to the asserted state. Once data valid signal 230 has been received, the method may move to block 408.

In response to receiving an asserted value for data valid signal 230, receiving unit 203 may sample the first data word (block 408). Upon sampling the first data word, receiving unit 203 may begin a next task. In other embodiments, receiving unit 203 may assert data request 210 to request a next value. In further embodiments, data request 210 may be asserted by another functional block in the system, such as, for example, processor 101 in FIG. 1. The method may conclude in block 409.

The method of FIG. 4 is merely illustrative and is not intended to limit the scope of the embodiments. It is noted that although the steps of the method are depicted as being performed in a sequential order, in other embodiments, some or all of the steps may performed in parallel and or in a different order.

Figure 5:
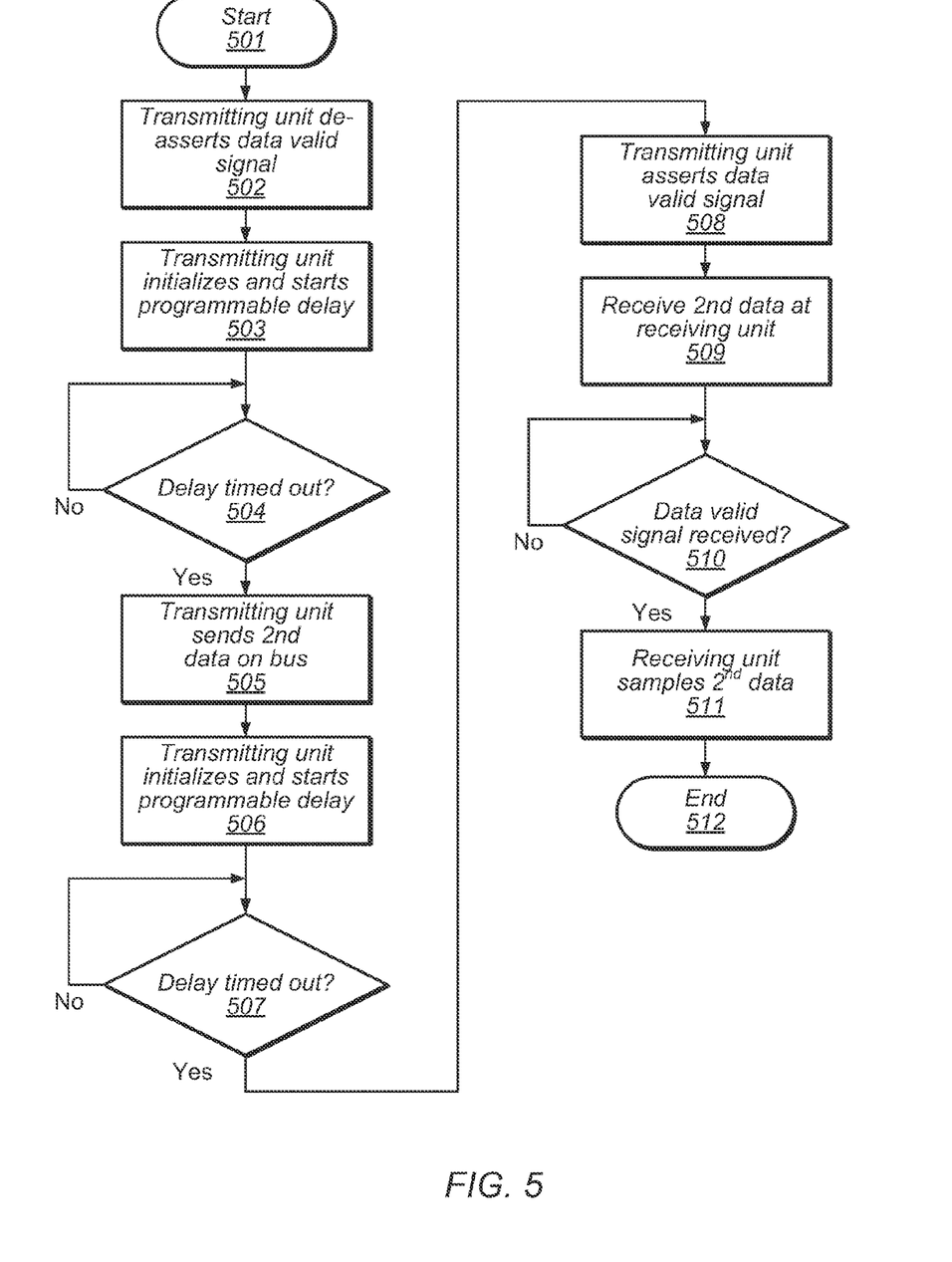
FIG. 5 illustrates an embodiment of a method for transferring data via a data bus.

Turning to FIG. 5, a flow chart is illustrated depicting a method for transferring additional data across a data bus. The method may be employed by a communications bus such as, for example, communications bus 200 in FIG. 2. Referring collectively to FIG. 3 and FIG. 5, the method may begin where the method of FIG. 4 ended, with receiving unit 203 having sampled the first data word and start at block 501. Again, transmitting unit 201 and receiving unit 203 are used as generic examples of transmitting and receiving units. However, this method may apply to any functional blocks coupled to a common data bus.

Responding to a request for more data from, for example, receiving unit 203, transmitting unit 201 may de-assert data valid signal 230 that was asserted in block 405 of the method of FIG. 4 (block 502). De-asserting data valid signal 230 may involve a propagation delay similar to the delay for asserting the signal. To allow time for the de-asserted value of data valid signal 230 to propagate to I/O block 230 before changing the value on data bit lines 225, transmitting unit 201 may wait another period of time.

Transmitting unit 201 may reset and start delay circuit 202 (block 503). In some embodiments, the time period may be the same as used in block 403 of the method of FIG. 4. In other embodiments, the time period may be programmable and may be adjusted based on current operating conditions.

The method may now be dependent upon delay circuit 202. Transmitting unit 201 may wait for a signal from delay circuit 202 to indicate the time period has expired (block 504). If the time period has not expired, the method may remain at block 504. Once the time period has expired, the method may move to block 505.

Upon the time period expiring, transmitting unit 201 may write a second data word to data bit lines 225 (block 505). As stated above, values written onto data bit lines 225 by transmitting unit 201 may experience propagation delays before the values can be read by receiving unit 203.

To account for the propagation delay, transmitting unit 201 may again delay asserting data valid signal 230 after writing the new value on data bit lines 225. Transmitting unit 201 may again reset and start delay circuit 202 (block 506). In embodiments with a programmable delay timer, this period of time may be different from the period of time set in block 503.

The method may now be dependent upon delay circuit 202. Transmitting unit 201 may wait for a signal from delay circuit 202 to indicate the time period has expired (block 507). If the time period has not expired, the method may remain at block 507. Once the time period has expired, the method may move to block 508.

Transmitting unit 201 may re-assert data valid signal 230 upon the time period expiring (block 508). Asserting data valid signal 230 may indicate to receiving unit 203 that the second data value is ready to be sampled. As disclosed above, in some embodiments, data valid signal 230 may have a similar or shorter propagation delay than data bit lines 225.

Receiving unit 203 may then receive the second data word from transmitting unit 201 (block 509). In some embodiments, the second data word may be received before the last time period expires and in other embodiments the data word may be received after the last time period expires.

Receiving unit 203 may then wait for data valid signal 230 to be asserted (block 510). If data valid signal 230 has not been received, then the method may remain in block 510. Once data valid signal 230 has been received, the method may move to block 511.

In response to receiving an asserted value for data valid signal 230, receiving unit 203 may sample the second data word (block 511). Upon sampling the second data word, receiving unit 203 may begin a next task. In other embodiments, receiving unit 203 may re-assert data request 210 to request another value. In further embodiments, data request 210 may be asserted by another functional block in the system, such as, for example, processor 101 in FIG. 1.

The method depicted in of FIG. 5 is merely an example. It is noted that in other embodiments, different operations and different orders of operations are possible and contemplated.

Figure 6:
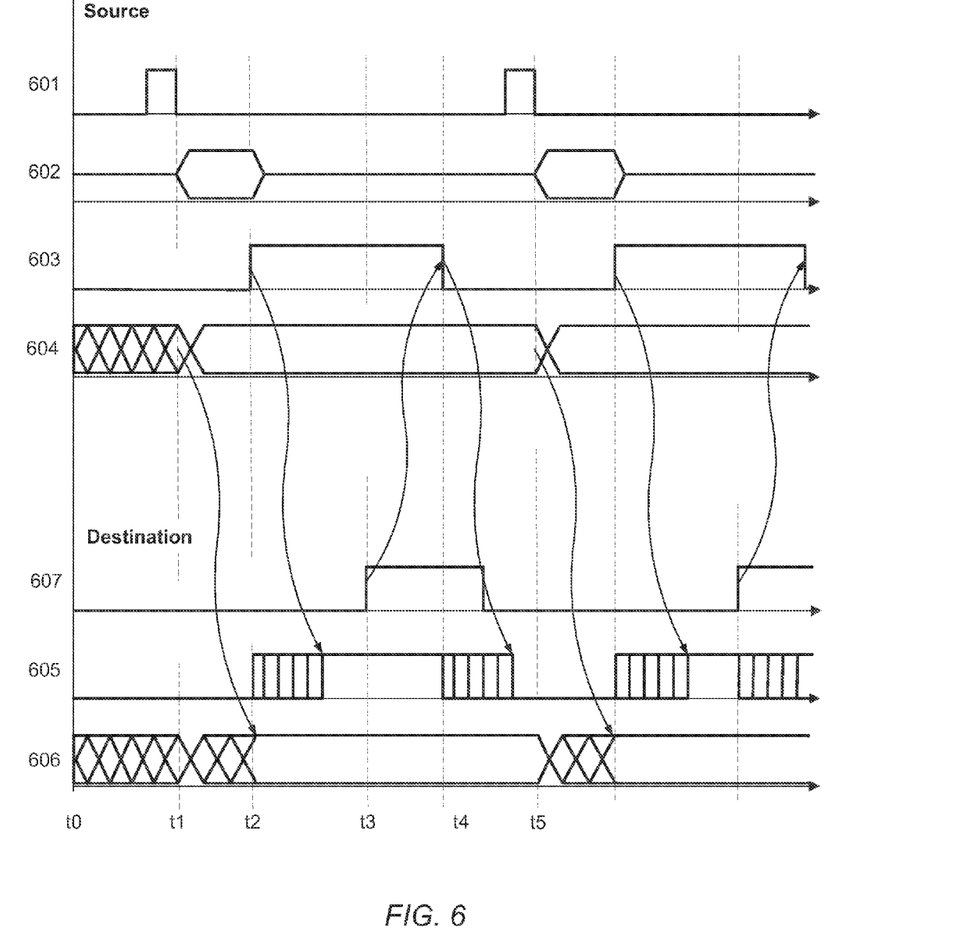
FIG. 6 illustrates possible waveforms corresponding to another embodiment of a data bus.

Turning to FIG. 6, alternate example waveforms that may correlate to signals in the embodiment of FIG. 2 are illustrated. Referring collectively to the waveforms in FIG. 6 and communications bus 200 from FIG. 2, another example of communications across communications bus 200, such as, for example, from transmitting unit 201 to receiving unit 203, is presented with the addition of using acknowledge signal 235.

It is known that any functional blocks may be used in place of transmitting unit 201 and receiving unit 203.

Waveforms 601-604 may correspond to signals 301-304, respectively, as described in relation to FIG. 3, representing signals as they appear at the interface to transmitting unit 201. Waveforms 605-606 may correspond to signals waveforms 305-306, respectively, also as described in relation to FIG. 3, representing signals as they appear at the interface to receiving unit 203. Waveform 607 is introduced in FIG. 6 and may represent acknowledge signal 235 as it appears at the interface to receiving unit 203.

At time t0, data bit lines 225 may have an indeterminate value at both transmitting unit 201 and receiving unit 203 as shown by waveforms 603 and 606. In some embodiments, an indeterminate value may refer to data bit lines 225 having a voltage level in-between a high level and a low level, such that the receiving circuitry may not be able to determine an accurate value. In other embodiments, an indeterminate value may refer to a previous value transmitted on the bus, by either transmitting unit 201 or by another functional unit coupled to data bus 220. Data valid signal 230 and acknowledge signal 235 are low at this time, which may indicate that data bit lines 225 are not ready for reading. Data request 210 is also low at this time, indicating no request for data.

At time t1, a falling edge on data request 210 may be received by transmitting unit 201. In response to the falling edge, delay circuit 202 may be initialized and begin counting a time period. Also responsive to the falling edge of data request 210, transmitting unit 201 may write a new value to data bit lines 225. The new value written by transmitting unit 201 may take some time to propagate to receiving unit 203. The value on data bit lines 225 at the I/O interface may propagate through sometime after t1 and before t2. This propagation delay is highlighted by the arrow from waveform 604 to waveform 606 after time t1.

At time t2, delay circuit 202 may complete counting the time period and may assert a signal to transmitting unit 201 and then may go into an idle state. In response to the end of the time period, transmitting unit 201 may assert data valid signal 230. The data valid signal may take time to propagate to receiving unit 203. This propagation delay is highlighted by the arrow from waveform 603 to waveform 605 after time t2. Responsive to receiving the rising edge of data valid signal 230, receiving unit 203 may sample data bit lines 225.

At time t3, receiving unit 203 may have sampled data bit lines 225 and in response, may assert acknowledge signal 235 to indicate receiving unit 203 is done sampling the current data word. Acknowledge signal 235 may take time to propagate from receiving unit 203 to transmitting unit 201, as highlighted by the arrow from waveform 607 to waveform 603 after time t3.

Transmitting unit 201 may receive the asserted value of acknowledge signal 235 at time t4. In response to the acknowledgement from receiving unit 203, transmitting unit 201 may de-assert data valid signal 230. Note that in the discussion of FIG. 3, data valid signal 230 may remain asserted until a next data request is received, due to transmitting unit 201 not knowing when receiving unit 203 may receive data valid signal 230. In the embodiment of FIG. 6, since receiving unit 203 may indicate reception of data with acknowledge signal 235, transmitting unit 201 may de-assert data valid signal 230 before data request 210 is asserted again. As previously discussed, de-asserted data valid signal 230 may be delayed before being received by receiving unit 203.

At time t5, another falling edge of data request 210 may be received by transmitting unit 201, indicating the next data may have been requested. In response to the falling edge, delay circuit 202 may initialize and begin counting another time period. In some embodiments, this time period may be the same the previous time period and in other embodiments, the time period may change responsive to changing operating conditions. Transmitting unit 201 may write a next data value to data bit lines 225. At this point, behavior of communications bus 200 may now repeat as described for times t1-14.

It is noted that the waveforms illustrated in FIG. 6 are merely examples and are simplified for clarity. In various embodiments, the waveforms may vary due to, for example, the specific circuits used, the technology the circuits are created in, and potential electromagnetic noise within the system. In addition, the polarity of the signals may differ from what is illustrated, such as, for example, data request 210 may be active on a rising edge instead of active on a falling edge as illustrated in FIG. 6.

Figure 7:
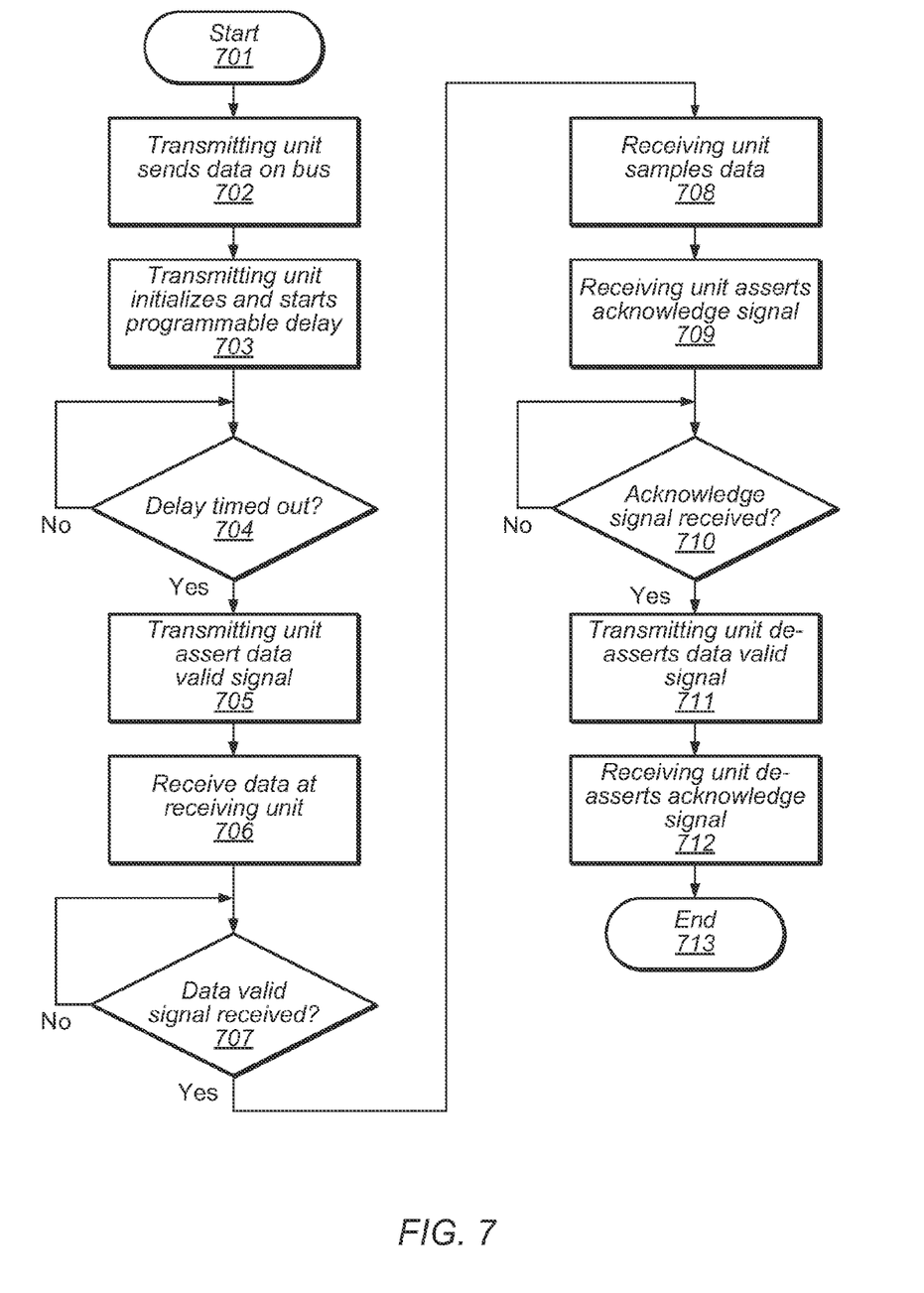
FIG. 7 illustrates another embodiment of a method for transferring data via a data bus.

In FIG. 7, a flow chart is illustrated depicting a method for transferring data across a data bus that may correlate to the waveforms of FIG. 6. The method may also be utilized by a communications bus such as, for example, communications bus 200 in FIG. 2. Referring collectively to FIG. 6 and FIG. 7, the method may begin in block 701. As previously stated, this method may apply to any functional blocks coupled to a common data bus.

Responding to a request for data from, for example, receiving unit 203, transmitting unit 201 may write a data word to data bit lines 225 (block 702). As discussed above, values written onto data bit lines 225 by transmitting unit 201 may experience propagation delays before the values can be read by receiving unit 203.

To account for any propagation delay from transmitting unit 201 to receiving unit 203, transmitting unit 201 may reset and start delay circuit 202 (block 703). In some embodiments, the time period may be a fixed amount of time set by the design of the circuit. In other embodiments, the time period may be programmable and may be adjusted based on current operating conditions. In further embodiments, the time period may be established during factory testing of the SoC or testing of the device in which the SoC is used.

Transmitting unit 201 may wait for a signal from delay circuit 202 to indicate the time period has expired (block 704). If the time period has not expired, the method may remain at block 704. Once the time period has expired, the method may move to block 705.

Transmitting unit 201 may assert data valid signal 230 upon the time period expiring (block 705). Asserting data valid signal 230 may indicate to receiving unit 203 that data bit lines 225 are ready to be sampled. In various embodiments, data valid signal 230 may be an active high signal or an active low signal. Data valid signal 230 may have a similar delay as data bit lines 225. In other embodiments, data valid signal 230 may have a shorter propagation delay than data bit lines 225.

Receiving unit 203 may receive the first data word from transmitting unit 201 (block 706). In some embodiments, the first data word may be received before the time period expires and in other embodiments the data word may be received after the time period expires. In the case in which the data word is received after the time period expires, the timing of data bus 220 may be reliant on the propagation delay of data valid signal 230 to help ensure data valid signal 230 isn't received by receiving unit 203 before the data word is received.

Receiving unit 203 may wait for data valid signal 230 to be asserted (block 707). If data valid signal 230 has not been received, then the method may remain in block 707. Once data valid signal 230 has been received, the method may move to block 708.

In response to receiving an asserted value for data valid signal 230, receiving unit 203 may sample the data word (block 708). In some embodiments, receiving unit 203 may store the sampled data value in a local buffer where the value may be used later as sampled or may be combined with data previously received or data to be received. For example, the sampled data may be a hash code generated from a received file and compared to a hash code received with the file to determine if the file was received without errors. In other embodiments, the sampled data may be a hash code generated from a file to be transmitted and receiving unit 203 may send the value to a communications interface, such as, for example, a USB interface.

Responsive to sampling the data word, receiving unit 203 may assert acknowledge signal 235 (block 709). By asserting acknowledge signal 235, receiving unit 203 may indicate to transmitting unit 201 that the data has been sampled. As with other signals in data bus 220, acknowledge signal 235 may take time to propagate to transmitting unit 201.

The method next depend upon the state of acknowledge signal 235 (block 710). In some embodiments, transmitting unit 201 may wait for acknowledge signal 235 to be asserted. In further embodiments, transmitting unit 201 may perform other functions while waiting for acknowledge signal 235 to be asserted. Transmitting unit 201 may poll acknowledge signal 235 until the signal is asserted. In other embodiments, an edge sensitive trigger circuit may be used to detect the transition of acknowledge signal 235 from the de-asserted state to the asserted state. If acknowledge signal 235 has not been received, then the method may remain in block 710. Once acknowledge signal 235 has been received, the method may move to block 711.

In response to receiving acknowledge signal 235 from receiving unit 203, transmitting unit 201 may de-assert data valid signal 230 (block 711). As has been described previously, the de-asserted data valid signal 230 may take time to propagate to receiving unit 203.

Receiving unit 203 may de-assert acknowledge signal 235 (block 712). In some embodiments, receiving unit 203 may de-assert acknowledge signal 235 responsive to receiving de-asserted data valid signal 230. In other embodiments, receiving unit 203 may de-assert after a given number of system clock cycles. In further embodiments, receiving unit 203, or another functional block in the system, may assert data request 210 to request a next value. The method may end in block 713.

The method of FIG. 7 is merely an example and is not intended to limit the scope of the embodiments. It is noted that in various embodiments, the blocks presented in the method of FIG. 7 may be executed in a different order and some blocks may be executed in parallel. For example, in some embodiments, the receiving unit may receive data (block 706) before the transmitting unit asserts the data valid signal (block 705).

Method for Static Timing Analysis

Figure 9:
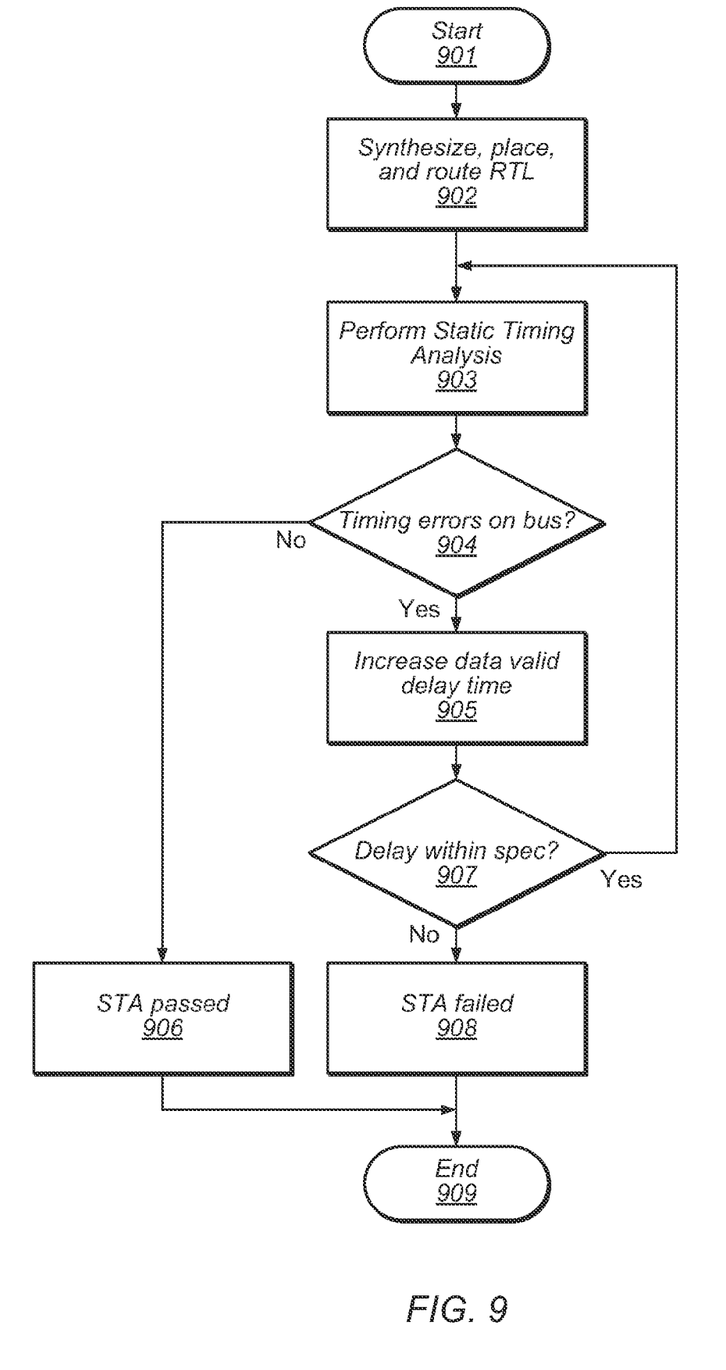
FIG. 9 illustrates an embodiment of a method for performing static timing analysis.

Turning now to FIG. 9, a flow chart is illustrated depicting an embodiment of a method for performing static timing analysis. The method depicted in FIG. 9 may be employed during the development of an SoC, such as, for example, SoC 100 in FIG. 1 which may include a bus system, such as for example, communications bus system 200 in FIG. 2. The method of FIG. 9 may be implemented by a computer system executing instructions stored in a computer-readable storage medium. Referring collectively to FIG. 1, FIG. 2, and FIG. 9, the method may begin in block 901.

The method may begin with the initial design of SoC 100 being completed in a Register Transfer Language (RTL) and then synthesized, placed and routed (block 902). RTL is a computer program used to represent digital circuits. The act of compiling an RTL program may be referred to as synthesizing the design and may correspond to translating the RTL code into a gate-level netlist. The gate-level netlist may be placed and routed, which may include placing the various gates (commonly referred to as "standard cells") in a physical location relative to each other and routing electrical connections between the various gates. In some embodiments, extraction may be performed after gates have been placed and routed to generate estimates of parasitic wiring resistances and capacitances.

Static Timing Analysis (STA) may be performed on the placed and routed circuits (block 903). STA may include an analysis of the timing of various signals in SoC 100. The analysis may include estimating timing for digital signals, such as, for example, data bit lines 225. Two timing parameters that may be estimated in STA include setup and hold times. A setup time may refer to a time that data must be valid before it is sampled at the input of a latch, flip-flop, or any suitable storage circuit in a receiving unit, such as, for example, receiving unit 203. Hold time may refer to how long after a signal is sampled at the input of a latch, flip-flop, or any suitable storage circuit that the signal must remain valid at the receiving unit. A timing violation may refer to a signal having a setup or hold time that is too short, which may indicate that an invalid value could be sampled on the signal by the receiving unit.

The method may depend upon a determination if errors are found on data bit lines 225 during STA (block 904). The STA may detect timing errors such as setup or hold time violations on data bit lines 225 at receiving unit 203. If timing errors are detected, the method may move to block 905. If no timing errors are detected, the method may move to block 906.

If no timing errors were detected, then the STA may be considered successful (block 906). A passing condition may be recorded and the development of SoC 100 may move to the next step. In some embodiments, a future step may include an RTL change, which may result in a need to repeat STA. The method may end in block 909.

In response to detecting timing errors on data bit lines 225, a delay time on a data valid signal, such as, for example, data valid signal 230, may be increased. Increasing the delay of data valid 230 may provide more time for signals on data bit lines 225 to propagate from a transmitting unit such as, for example, transmitting unit 201.

The method may now depend upon the adjusted delay time on data valid signal 230 (block 907). A maximum delay time may be specified and determined by the requirements for SoC 100. If the adjusted delay time exceeds the specified maximum delay time, then the method may move to block 908. Otherwise, if the adjusted delay time is within allowable limits, then the method may return to block 903 and STA may be repeated. In some embodiments, the method may return to block 902 if RTL changes are required to fix timing errors.

Upon the adjusted delay time exceeding the specified maximum limit, then the STA may be considered to have failed (block 908). In such cases, more significant changes may be required to improve the timing of data bit lines 225. Design changes may include RTL changes, place and route changes, changes in process technology, or other suitable changes that may improve the propagation delays. The method may end in block 909.

The method of FIG. 9 is merely an example and is not intended to limit the scope of the embodiments. In other embodiments, the blocks presented in the method of FIG. 9 may be executed in a different order and some blocks may be executed in parallel.

Numerous variations and modifications will become apparent to those skilled in the art once the above disclosure is fully appreciated. It is intended that the following claims be interpreted to embrace all such variations and modifications.

What is claimed is:

1. A system, comprising:
a communications bus;
a first functional unit, coupled to the communications bus, wherein the first functional unit includes a delay circuit, and wherein the first functional unit is configured to:
transmit a first data value on the communications bus;
initiate the delay circuit at a first time assert the data valid signal, wherein the delay circuit is configured to assert the data valid signal after a first time period has elapsed since the first time; and
a second functional unit, coupled to the communications bus, wherein the second functional unit is configured to:
receive the first data value via the communications bus; and
sample the first data value in response to the assertion of the data valid signal;
wherein the first functional unit is further configured to:
determine that a second data value is ready to transmit;
de-assert the data valid signal independent of communication from the second functional unit, in response to the determination that the second data value is ready to transmit; and
initiate the delay circuit at a second time to drive the second data value on the communication bus in response to de-asserting the data valid signal, wherein the delay circuit is further configured to drive the second data value on the communications bus after a second time period has elapsed since the second time.

2. The system of claim 1, wherein the first time period and the second time period are different.

3. The system of claim 1, wherein to initiate the delay circuit, the delay circuit is configured to charge a resistor-capacitor (RC) circuit.

4. The system of claim 1, wherein the first functional unit is further configured to initiate the delay circuit at a third time to assert the data valid signal in response to the delay circuit driving the second data value on the communications bus.

5. The system of claim 4, wherein the delay circuit is further configured to assert the data valid signal after a third time period has elapsed since the third time.

6. The system of claim 5, wherein the second functional unit is further configured to:
receive the second data value via the communications bus; and
sample the second data value in response to the assertion of the data valid signal.

7. The system of claim 1, wherein the first time period is dependent upon results of a static timing analysis performed prior to manufacturing of the system.

8. A method for transmitting data, comprising:
transmitting, by a source device, a first data value on a bus;
initiating a first delay at a first time by the source device responsive to transmitting the first data value;
asserting, by the source device, a data valid signal responsive to a determination that a first period of time has elapsed since the transmission of the first data value;
receiving the first value at a destination device;
sampling, by the destination device, the first data value in response to the assertion of the data valid signal;

determining, by the source device, that a second data value is ready to transmit;

de-asserting, by the source device, independent of communication from the destination device, the data valid signal in response to the determination that the second data value is ready to transmit;

initiating a second delay at a second time by the source device in response to de-asserting the data valid signal; and transmitting, by the source device, the second data value on the bus response to a determination that a second period of time elapsed since the second time.

9. The method of claim 8, wherein transmitting, by the source device, the second data value on the bus further comprises adjusting the second period of time dependent upon current operating conditions of the source device and the destination device.

10. The method of claim 8, wherein asserting the data valid signal further comprises adjusting the first period of time dependent upon current operating conditions of the source device and the destination device.

11. The method of claim 8, wherein the first period of time and the second period of time are dependent upon results of a static timing analysis performed prior to manufacture of the source and destination devices, and wherein the first period of time and the second period of time are not equal.

12. The method of claim 8, further comprising initiating a third delay at a third time by the source device in response to transmitting the second data value.

13. The method of claim 12, further comprising asserting, by the source device, the data valid signal in response to a determination that a third period of time has elapsed since the third time.

14. The method of claim 8, wherein initiating a second delay comprises asserting an input of a chain of invertors arranged in series, wherein an output of the chain of invertors is delayed from the assertion of the input of the chain of invertors.

15. A device, comprising:
a delay circuit configured to indicate an elapse of a predetermined time period, wherein the predetermined time period is dependent upon settings of the delay circuit;
a data I/O buffer configured to transmit data on a bus to a destination dependent upon an enable signal;
control logic coupled to the data I/O buffer, wherein the control logic is configured to:
assert the enable signal responsive to a determination that a first data value is ready for transmission;
initiate the delay circuit to indicate an elapse of a first time period in response to asserting the enable signal;
assert a data valid signal in response to the elapse of the first time period;
de-assert the data valid signal responsive to a determination that the second data value is ready for transmission via the data I/O buffer, wherein the control logic de-asserts the data valid signal independent of communication from the destination;
initiate the delay circuit to indicate an elapse of a second time period; and
assert the enable signal in response to a elapse of the second time period.

16. The device of claim 15, wherein the wherein the first time period and the second time period are different.

17. The device of claim 15, wherein to delay the enable signal, the delay circuit includes a timer circuit.

18. The device of claim 15, wherein the control logic is further configured to:
initiate the delay circuit to indicate an elapse of a third time period in response to the elapse of the second time period;
assert the data valid signal in response to the elapse of the third time period.

19. The device of claim 15, wherein to initiate the delay circuit, the control logic id further configured initiate the delay circuit dependent upon current operating conditions of the device.

20. The device of claim 16, signal wherein the first period of time is dependent upon results of a static timing analysis performed prior to manufacture of the device.

* * * * *